United States Patent
Endo et al.

(10) Patent No.: US 9,067,515 B2
(45) Date of Patent: Jun. 30, 2015

(54) LOCKING DEVICE

(75) Inventors: Takayuki Endo, Toyota (JP); Hideki Uramichi, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 410 days.

(21) Appl. No.: 13/514,128

(22) PCT Filed: Sep. 1, 2010

(86) PCT No.: PCT/JP2010/064901
§ 371 (c)(1),
(2), (4) Date: Jul. 23, 2012

(87) PCT Pub. No.: WO2011/070829
PCT Pub. Date: Jun. 16, 2011

(65) Prior Publication Data
US 2012/0279337 A1    Nov. 8, 2012

(30) Foreign Application Priority Data

Dec. 7, 2009 (JP) .................................. 2009-277396

(51) Int. Cl.
*F16H 35/00* (2006.01)
*B60N 2/235* (2006.01)

(52) U.S. Cl.
CPC ......... *B60N 2/2356* (2013.01); *Y10T 74/19637* (2015.01)

(58) Field of Classification Search
CPC ...... A47C 1/026; A47C 1/03238; B60N 2/22; B60N 2/235; B60N 2/224
USPC ........... 74/575–578; 297/367 L, 367 P, 367 R
See application file for complete search history.

(56) References Cited

U.S. PATENT DOCUMENTS 4,789,205 A * 12/1988 Pipon et al. ............... 297/367 R
7,475,945 B2 * 1/2009 Reubeuze et al. ........ 297/367 R
(Continued)

FOREIGN PATENT DOCUMENTS

JP    62-192115    8/1987
JP    2001-25415   1/2001
(Continued)

OTHER PUBLICATIONS

JP 2001025415A English Translation with relevant figures attached.*

*Primary Examiner* — William Kelleher
*Assistant Examiner* — Thomas Magnuson
(74) *Attorney, Agent, or Firm* — Greenblum & Bernstein, P.L.C.

(57) ABSTRACT

In a reclining device, a pawl is guided by guide walls formed in a guide while both of side portions thereof are applied thereto, so as to be movable only radially inwards and outwards. The pawl is divided into two divisional pawls configured to obliquely contact with each other, so as to be pressed and moved away from each other in opposite lateral directions and to be pressed against the guide walls positioned in respective lateral directions when the pawl is pressed and moved in the advancing direction by the pressing cam. A division line is set to form inclined surfaces that are configured to bring the two divisional pawls into face contact with each other obliquely with respect to the advancing moving direction of the pawl, and vertical surfaces that are configured to bring the two divisional pawls into face contact with each other in a direction perpendicular to the pawl advancing moving direction.

1 Claim, 9 Drawing Sheets

(56) References Cited

U.S. PATENT DOCUMENTS

| | | |
|---|---|---|
| 7,766,429 B2 | 8/2010 | Kuroda et al. |
| 7,819,471 B2 * | 10/2010 | Ishihara et al. .......... 297/216.13 |
| 8,616,649 B2 * | 12/2013 | Uramichi et al. .......... 297/367 P |
| 2010/0276976 A1 | 11/2010 | Kumazaki et al. |

FOREIGN PATENT DOCUMENTS

| | | | |
|---|---|---|---|
| JP | 2001025415 A | * | 1/2001 |
| JP | 3596010 | | 9/2004 |
| WO | 2008/146523 | | 12/2008 |

* cited by examiner

LOCKING DEVICE

TECHNICAL FIELD

The present invention relates to a locking device. More particularly, the present invention relates to a locking device that is configured to maintain a first member and a second member capable of performing a relative movement in a condition in which the relative movement therebetween can be restricted by meshing engagement of teeth.

BACKGROUND ART

Conventionally, in a known vehicle seat, a seat back is connected to a seat cushion via a reclining device (a locking device), so as to perform an adjusting operation of a backrest angle thereof Japanese Patent No. 3596010 described below discloses an example of a specific construction of the reclining device described above. In the description, the reclining device has a gear that is integrally formed in a frame of the seat back, and a pawl that is capable of linearly advancing and retreating with respect to a frame of the seat cushion. Upon meshing engagement of a toothed surface of the pawl with a toothed surface of the gear, the backrest angle of the seat back can be secured.

More particularly, both side portions of the above-described pawl are guided by raised wall-shaped guide walls formed in the frame of the seat cushion, so that the pawl can be supported to be slidable in the advancing/retreating direction described above. Formed between the pawl and both of the guide walls is small clearances for securing slidability of the pawl. The clearances may cause backlash in the pawl and both of the guide walls. The backlash may cause looseness in a locked condition between the pawl and the gear.

In view of this, in the reclining device described above, the pawl is obliquely divided into two pawl portions along the advancing/retreating direction. When the inner pawl portion positioned inside is pushed outwardly, the inner pawl portion and the outer pawl portion can be slid obliquely along inclined contact surfaces thereof in a direction in which they are spaced from each other, so that the clearances between the pawl and both of the guide walls can be cleared. Thus, the pawl and the gear can be in meshing engagement with each other, so as to be locked.

However, in the conventional technique described above, because the pawl is divided obliquely, in a condition in which the pawl and the gear are locked by meshing engagement, a load in a rotating direction applied to the outer pawl portion from the gear cannot be properly applied to the guide walls. In particular, when the load in the rotating direction is applied to the outer pawl from the gear, the load can be applied to the inner pawl portion after it is resolved into an inwardly-directed component via the inclined contact surfaces of the inner and outer pawl portions. As a result, an excessive load can be applied to an operational component such as a cam pressing the inner pawl from an inner side.

Thus, there is a need in the art to provide an improved locking device.

SUMMARY OF THE INVENTION

A first aspect of the present invention may provide a locking device capable of forming a condition in which relative rotation of a first member and a second member configured to move relative to each other is regulated by meshing engagement of teeth and capable of maintaining the condition, which may include a pawl, a pressing cam and an engaged tooth. The pawl is provided and guided so as to be capable of advancing and retreating in a specific linear direction with respect to the first member. The pressing cam is configured to press the pawl in an advancing direction with respect to the first member. The engaged tooth is formed in the second member and configured to mesh with an engagement tooth of the pawl pressed that is moved in the advancing direction by the pressing cam. The pawl is guided by raised wall-shaped guide walls formed in the first member while both of side portions thereof corresponding to an advancing/retreating moving direction are applied thereto. The pawl is divided into two divisional pawls configured to obliquely contact with each other, so as to be pressed and moved away from each other in opposite lateral directions and to be pressed against the guide walls positioned in respective lateral directions when the pawl is pressed and moved in the advancing direction by the pressing cam. A division line dividing the pawl into the two divisional pawls is set to form inclined surfaces that are configured to bring the two divisional pawls into face contact with each other obliquely with respect to the advancing moving direction of the pawl, and vertical surfaces that are configured to bring the two divisional pawls into face contact with each other in a direction perpendicular to the pawl advancing moving direction relative to the inclined surfaces.

According to the first aspect, when the pawl is pushed and moved in the advancing direction by the pressing cam, the divisional pawls are moved in the lateral directions opposite to each other due to the oblique contact structure in which the inclined surfaces thereof can contact each other. As a result, the engagement tooth of the divisional pawl is pressed against and meshed with the engaged tooth formed in the second member while the divisional pawls are respectively pressed against the guide walls. Thus, both side portions of the pawl are respectively pressed against both of the guide walls, so that the pawl can be meshed with the engaged tooth without producing looseness between the pawl and the first member in the lateral directions.

In this meshed condition, even if the pawl is applied with a load that rotates the second member with respect to the first member in the rotating direction, this load can be received relatively straight by the guide wall corresponding to a direction of the load due to the contact structure in which the vertical surfaces facing in the rotating direction of the pawl contact each other. As a result, the load applied to the pressing cam pressing the pawl in the advancing direction can be reduced. Therefore, even though the oblique contact structure for reducing the looseness is provided, lock strength of the pawl can be secured.

In a second aspect, the division line dividing the pawl into the two divisional pawls is set as a vertical division line for dividing in the side direction an outer peripheral surface of the pawl at the forward end side in the advancing direction thereof.

According to the second aspect, the division line of the pawl is set as a vertical division line that divides the outer circumferential surface of the pawl in the lateral direction. Therefore, as compared with a case in which the division line is set as an oblique division line that does not divide the outer circumferential surface, an inclination angle (a pressure angle) of each of the inclined surfaces can be relatively increased and at the same time, a length of each of the vertical surfaces can be lengthened.

DETAILED DESCRIPTION OF THE INVENTION

Figure 1:
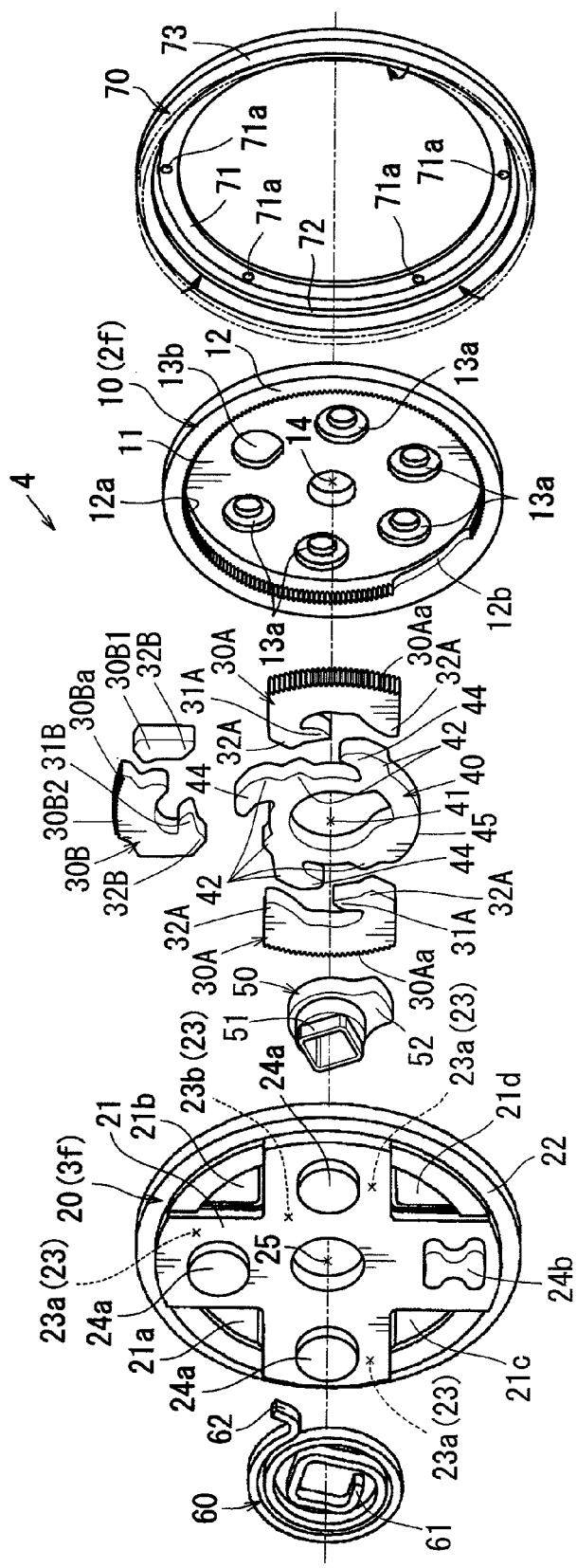
FIG. 1 is an exploded perspective view of a reclining device according to Embodiment 1, which view illustrates a construction thereof.

In the following, modes for carrying out the present invention will be described with reference to the drawings. In the following embodiments, a locking device of the present invention is applied to a reclining device connecting a seat back and a seat cushion of a vehicle seat.

Embodiment 1

First, a construction of reclining devices 4 (locking devices) according to Embodiment 1 will be described with reference to FIGS. 1 through 7. As shown in FIG. 2, the reclining devices 4 according to the present embodiment are positioned on both of the right and left sides of a vehicle seat 1, and connect a seat back 2 to a seat cushion 3 such that a backrest angle can be adjusted. In particular, the reclining devices 4 rotatably connect lower end portions of the right and left sides of the seat back 2 and rear end portions of the right and left sides of the seat cushion 3, and have a lock function that is capable of stopping rotation of the seat back 2.

Each of the reclining devices 4 is capable of normally locking the rotation of the seat back 2 by biasing, and maintains the seat back 2 in a condition in which the backrest angle is secured. Further, locked conditions of the reclining devices 4 can be simultaneously released by a pulling up operation of an operation lever 5 that is attached to an outer side of the seat cushion 3. Further, operation shafts 4c are passed through central portions of the reclining devices 4. Each of the operation shafts 4c functions to perform a switching operation between a lock mode and an unlock mode.

The operation shafts 4c are integrally connected to each other via a connection rod 4r. The operation shafts 4c are configured to be integrally rotated about axes thereof when the pulling up operation of the operation lever 5 connected to one of the operation shafts 4c is performed, so as to release the locked conditions of the reclining devices 4. Conversely, the operation shafts 4c are configured to return the reclining devices 4 to the locked conditions by biasing when the pulling up operation of the operation lever 5 is released.

Further, the seat back 2 is normally biased in a rotational direction in which it is tilted forwardly by a biasing force of a biasing spring (not shown) that is provided between the seat back 2 and the seat cushion 3. Thus, when the pulling up operation of the operation lever 5 is performed to release the locked conditions of the reclining devices 4 in a condition in which no one is sitting on the vehicle seat 1, the seat back 2 is rotated to be tilted forwardly by biasing, so as to be folded onto an upper surface portion of the seat cushion 3.

Generally, the reclining devices 4 can be returned to the locked conditions by biasing by releasing the pulling up operation of the operation lever 5 when the seat back 2 is in an angle range (a locking zone) in which the seat back 2 can be used as a backrest. However, the reclining devices 4 cannot be returned to the locked conditions even if the pulling up operation of the operation lever 5 is released when the seat back 2 is in an angle range (a free zone) in which the seat back 2 has a forwardly tilted posture so as to not be used as the backrest.

Therefore, in order to fold the seat back 2 onto the upper surface portion of the seat cushion 3, the pulling up operation of the operation lever 5 is performed to release the locked conditions of the reclining devices 4. When the seat back 2 is tilted forwardly to a position beyond the locking zone, the seat back 2 can be automatically tilted forwardly until it is folded on the upper surface portion of the seat cushion 3 even if the operation lever 5 is released.

In the following, specific constructions of the reclining devices 4 will be described in detail. Although the reclining devices 4 are formed laterally symmetrically, they have the substantially same construction as each other. Therefore, in the following, only the construction of the reclining device 4 that is position on a right side in FIG. 2, i.e., on the outer side of the seat cushion 3, will be described as a representative of the reclining devices 4.

Figure 2:
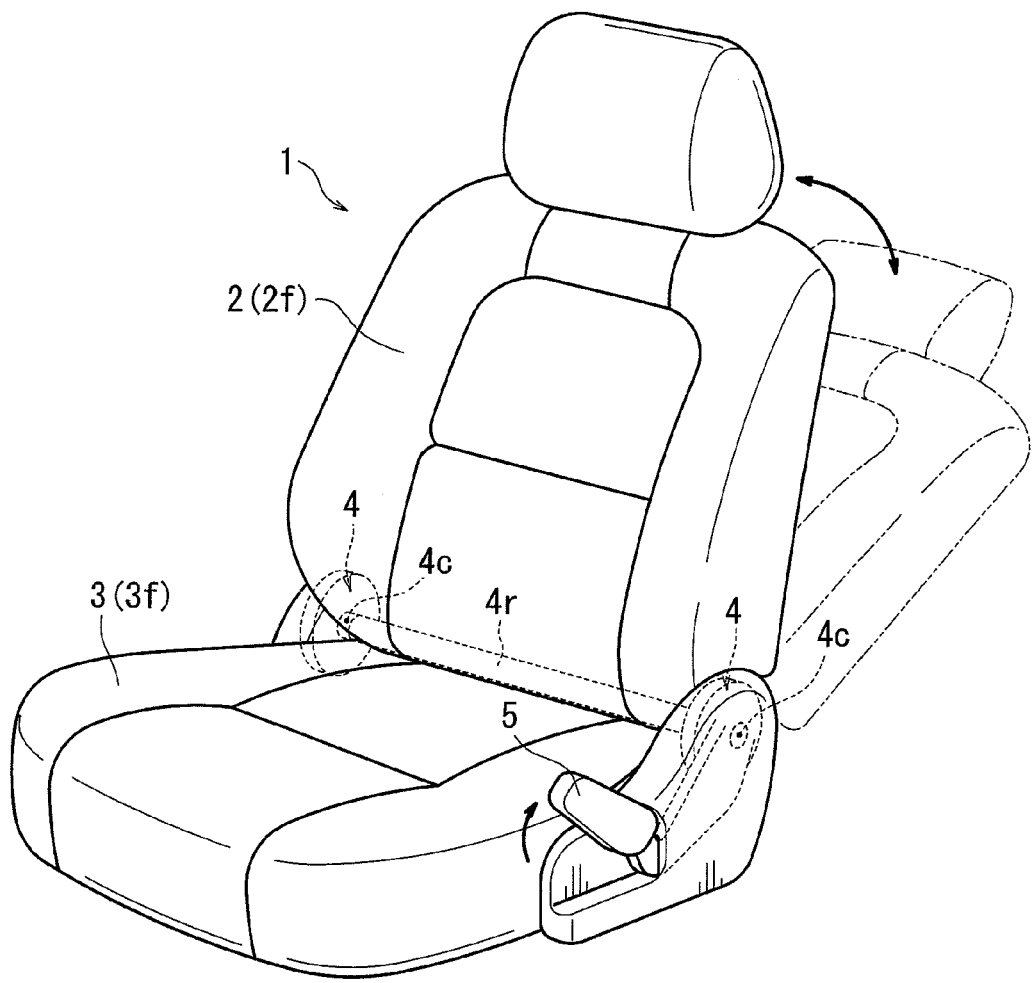
FIG. 2 is a perspective view of a vehicle seat.

As shown in FIG. 1, the reclining device 4 is composed of disk-shaped ratchet 10 and guide 20, three pawls 30A and 30B that are positioned therebetween and circumferentially arranged, a rotary cam 40 that is configured to move the pawls 30A and 30B radially inwards and outwards, a hinge cam 50 that is configured to rotate the rotary cam 40, a spiral spring 60 that is configured to bias the hinge cam 50 in one rotational direction, and an outer circumferential ring 70 that can hold the ratchet 10 and the guide 20 in a condition in which they are coupled in a mating direction (an axial direction), which components are combined together as a unit. Further, the ratchet 10 corresponds to a second member of the present invention. The guide 20 corresponds to a first member of the present invention. The rotary cam 40 corresponds to a pressing cam of the present invention.

In particular, the ratchet 10 has a disk portion 11 and a cylinder portion 12 that is formed in an outer circumferential portion of the disk portion 11. The cylinder portion 12 is cylindrically protruded in a thickness direction (an axial direction) which corresponds to a direction in which the ratchet 10 is coupled to the guide 20. The cylinder portion 12 is formed by half blanking the ratchet 10 in the thickness direction and has an inner circumferential surface formed therein. The inner circumferential surface of the cylindrical portion 12 has an inner circumferential toothed surface 12a having inner teeth, and an arcuate bulged surface 12b having no inner teeth and smoothly curved. Further, the inner circumferential toothed surface 12a corresponds to an engaged tooth of the present invention.

Figure 3:
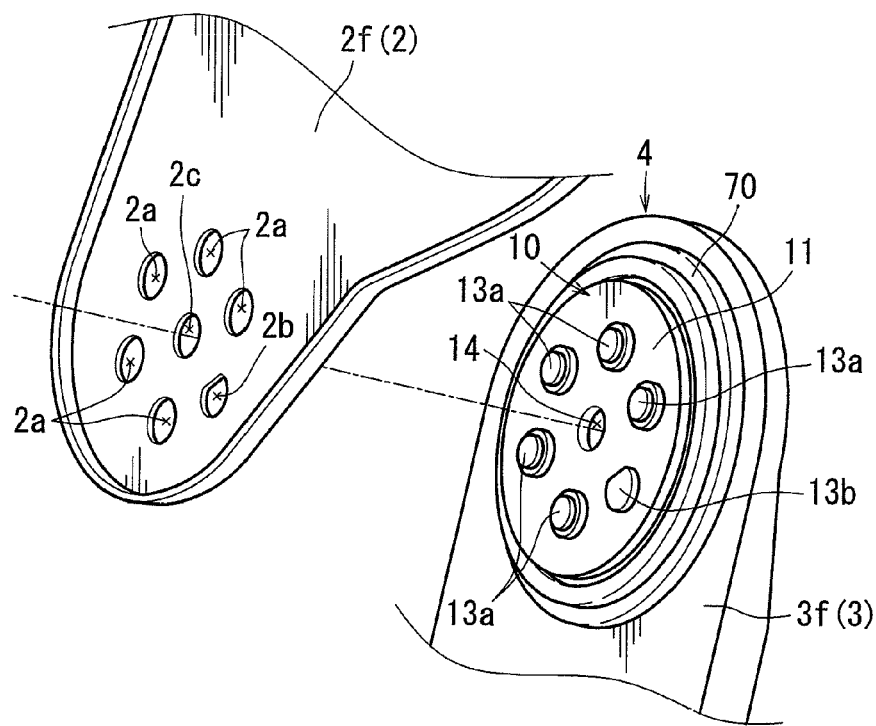
FIG. 3 is a perspective view of a ratchet and a back frame, which view illustrates a connection structure thereof.

The bulged surface 12b is formed in a single position in a circumferential direction on the inner circumferential surface of the cylinder portion 12, and is formed as a curved surface that is protruded radially inwards beyond a tooth tip surface of the inner circumferential toothed surface 12a. Further, formed through a central portion of the disk portion 11 is an axial hole 14 through which the above-described operation shaft 4c can be axially inserted. As shown in FIG. 3, in the ratchet 10 thus constructed, an outer disk surface of the disk portion 11 is integrally bonded and secured to a plate surface of an elongated plate-shaped back frame 2f that constitutes a frame of the seat back 2.

The disk portion 11 of the ratchet 10 has five dowels 13a that are cylindrically protruded from the outer disk surface thereof, and a D-shaped dowel 13b that is cylindrically protruded and partially cut away to have a D-shape. The dowels 13a and the D-shaped dowel 13b are positioned along a common circle on the disk portion 11 at equal intervals. The dowels 13a and the D-shaped dowel 13b are arranged and formed in positions inside the cylinder portion 12 and relatively near an outer peripheral side of the disk portion 11.

Figure 5:
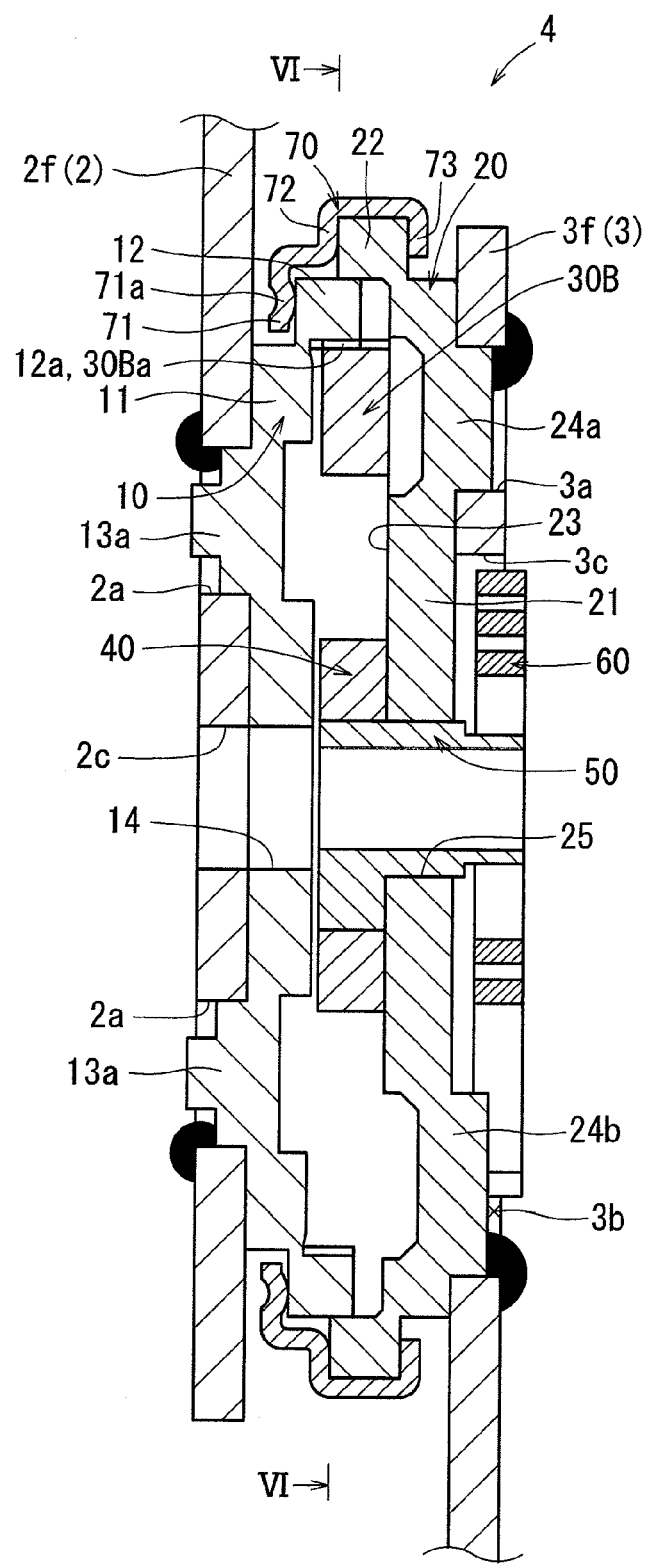
FIG. 5 is a sectional view taken along line V-V of FIG. 4, which view illustrates an internal structure of the reclining device.

On the other hand, formed in the back frame 2f are five dowel holes 2a and a D-shaped dowel hole 2b that are capable of receiving the dowels 13a and the D-shaped dowel 13b in axial directions for engagement. The dowel holes 2a and 2b are formed as through bores penetrating the back frame 2f in a thickness direction thereof. Therefore, the dowels 13a and the D-shaped dowel 13b are respectively engaged with the dowel holes 2a and the D-shaped dowel hole 2b of the back frame 2f. Thereafter, engaged portions are bonded by fusion bonding, so that the ratchet 10 can be securely integrally connected to the back frame 2f (FIG. 5). Further, formed in the back frame 2f is a through-hole 2c through which the above-described operation shaft 4c can be inserted in an axial direction. The through-hole 2c is formed as a through bore penetrating the back frame 2f in the thickness direction thereof.

Figure 6:
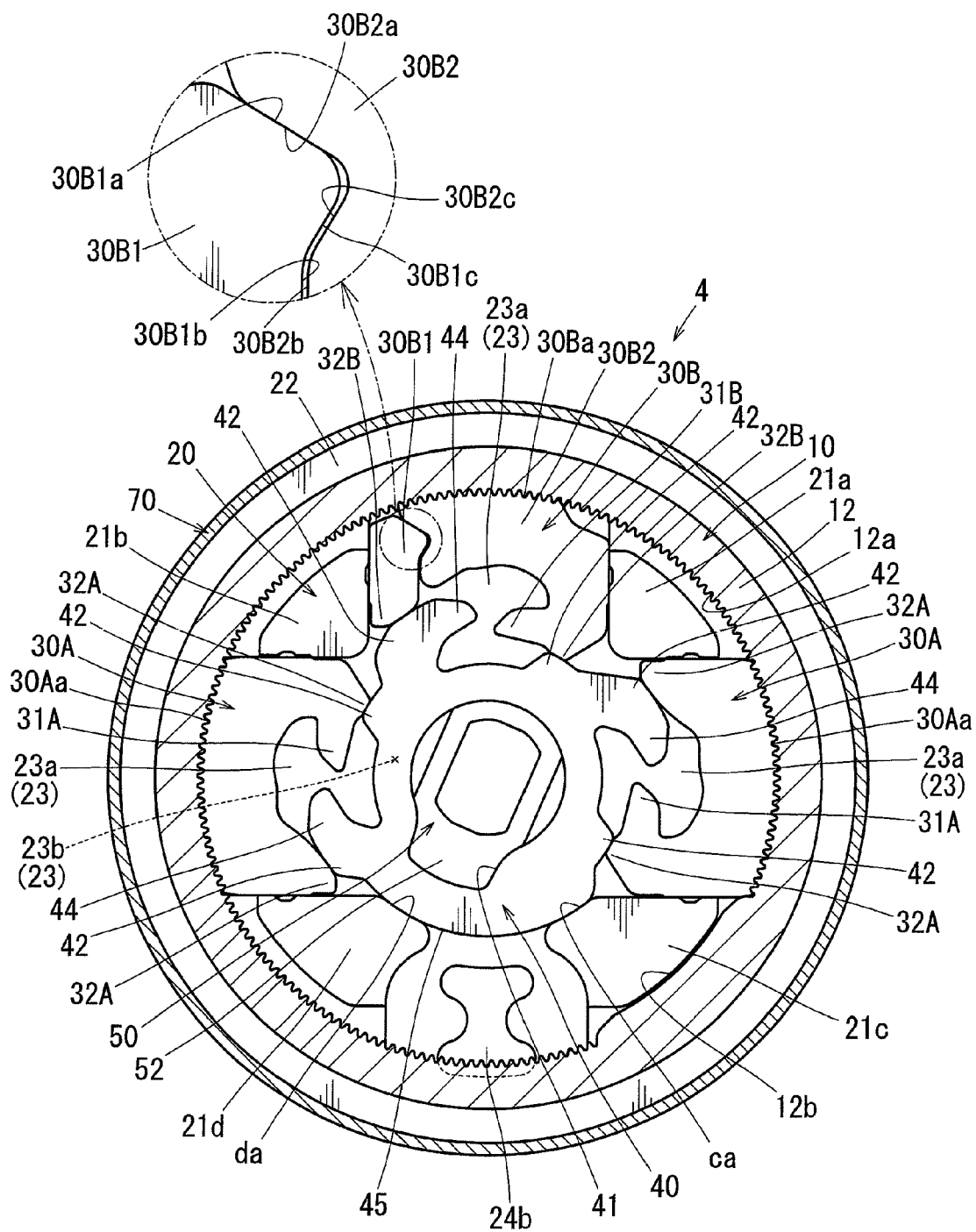
FIG. 6 is a sectional view taken along line VI-VI of FIG. 5, which view illustrates a locked condition of the reclining device.

As shown in FIG. 6, in the ratchet 10 described above, in a condition in which the bulged surface 12b thereof is circumferentially positioned such that it can interfere with none of the pawls 30A and 30B, when the pawls 30A and 30B move radially outwards, outer circumferential toothed surfaces 30Aa and 30Ba thereof can mesh with the inner circumferential toothed surface 12a. Thus, a rotational angle range of the seat back 2 in which circumferential positions of the bulged surface 12b and the pawls 30A and 30B do not overlap each other is determined as the locking zone in which the pawls 30A and 30B can be meshed with the ratchet 10.

However, in a condition in which the circumferential positions of the bulged surface 12b and the pawls 30A and 30B overlap, the bulged surface 12b is capable of contacting one of the pawls 30A and 30B so as to prevent the same from moving radially outwards. As a result, rotation of the rotary cam 40 which will be hereinafter described can be locked, so that the pawls 30A and 30B can be prevented from meshing with the inner circumferential toothed surface 12a of the ratchet 10. Thus, a rotational angle range of the seat back 2 in which the circumferential positions of the bulged surface 12b and that of the pawls 30A and 30B overlap each other is determined as the free zone in which the pawls 30A and 30B and the inner circumferential toothed surface 12a of the ratchet 10 can be prevented from being meshed with each other, so that the ratchet 10 and the guide 20 can be freely rotatable with respect to each other.

Next, with reference to FIG. 1 again, a construction of the guide 20 will be described. The guide 20 is formed as a disk having an outer diameter one size larger than the above-described ratchet 10. The guide 20 has a disk portion 21 and a cylinder portion 22 that is formed in an outer circumferential portion of the disk portion 21. The cylinder portion 22 is cylindrically protruded in a thickness direction (an axial direction) which corresponds to a direction in which the guide 20 is coupled to the ratchet 10. The cylinder portion 22 is formed by half blanking the guide 20 in the thickness direction.

The cylinder portion 22 of the guide 20 has an inner diameter that is slightly larger than an outer diameter of the cylinder portion 12 of the ratchet 10. As a result, as shown in FIG. 5, when the cylinder portion 12 of the ratchet 10 is fitted into an interior of the cylinder portion 22 of the guide 20, the cylinder portion 12 of the ratchet 10 and the cylinder portion 22 of the guide 20 can be loosely coupled to each other, so as to be coupled while they are axially rotatably supported by each other.

Figure 4:
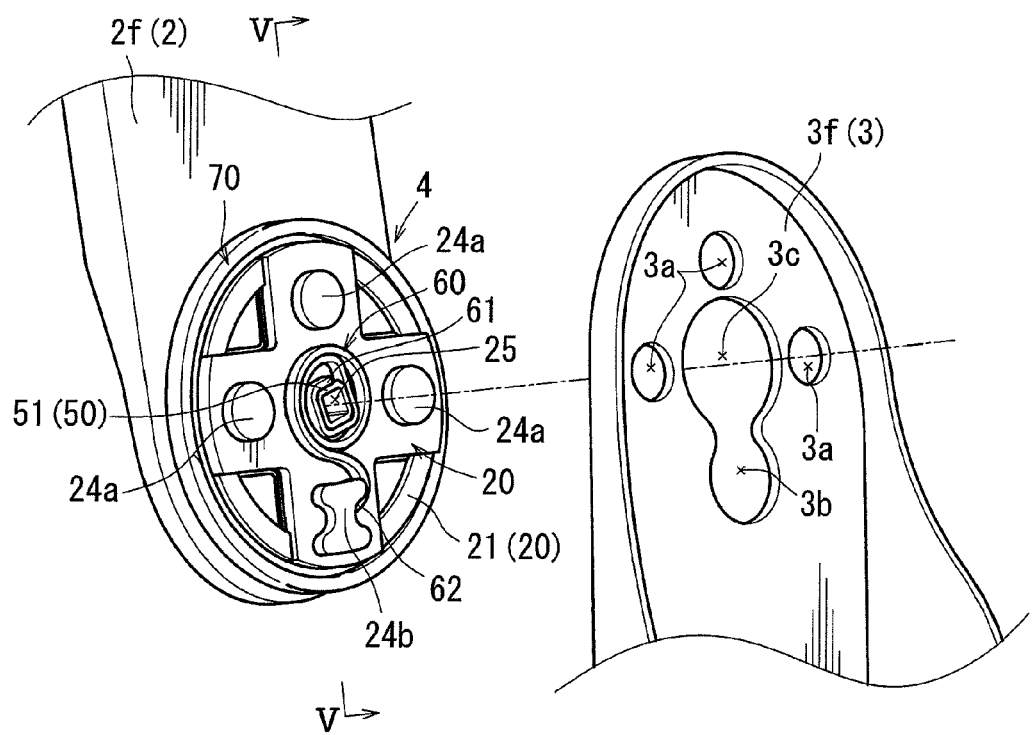
FIG. 4 is a perspective view a guide and a cushion frame, which view illustrating a connection structure thereof.

An axial hole 25 through which the above-described operation shaft 4c can be inserted in an axial direction thereof is formed through a central portion of the disk portion 21 of the guide 20 described above while it is penetrated therethrough. Further, as shown in FIG. 4, an outer disk surface of the disk portion 21 of the guide 20 is integrally bonded and secured to a plate surface of a plate-shaped cushion frame 3f that constitutes a frame of the seat cushion 3.

The disk portion 21 of the guide 20 has three dowels 24a that are cylindrically protruded from the outer disk surface thereof, and a spring engagement portion 24b that is formed as a projection partially having a constriction. Further, the spring engagement portion 24b is intended to be engaged with an outer end 62 of the spiral spring 60 which will be hereinafter described. The dowels 24a and the spring engagement portion 24b are positioned along a common circle on the disk portion 21 at equal intervals. The dowels 24a and the spring engagement portion 24b are arranged and formed in positions inside the cylinder portion 22 and relatively near an outer peripheral side of the disk portion 21.

On the other hand, formed in the cushion frame 3f are three dowel holes 3a and a through-hole 3b that are capable of receiving the dowels 24a and the spring engagement portion 24b in axial directions for engagement. The dowel holes 3a and 3b are formed as through bores penetrating the cushion frame 3f in a thickness direction thereof. The dowels 24a and the spring engagement portion 24b are respectively engaged with the dowel holes 3a and the through-hole 3b of the cushion frame 3f. Thereafter, engaged portions are bonded by fusion bonding, so that the above-described guide 20 can be securely integrally connected to the cushion frame 3f (FIG. 5). Further, formed in the cushion frame 3f is a large hole 3c through which the above-described operation shaft 4c and the spiral spring 60 which will be hereinafter described can be inserted in axial directions thereof. The large hole 3c is formed as a through bore penetrating the cushion frame 3f in the thickness direction thereof. The above-described through-hole 3b is formed to communicate with the large hole 3c.

With reference to FIG. 1 again, the disk portion 21 of the above-described guide 20 has a guide groove 23 that is formed in an inner disk surface thereof so as to be recessed in an X-shape in a thickness direction thereof. The guide groove 23 is formed by half blanking the disk portion 21 in the thickness direction. Three groove portions positioned on an upper side and right and left sides thereof are formed as pawl receiving grooves 23a that are respectively capable of slidably receiving the above-described three pawls 30A and 30B therein. Further, a groove portion positioned in a central portion of the X-shaped guide groove 23 is formed as a cam receiving groove 23b that is capable of rotatably receiving the rotary cam 40 which will be hereinafter described. As shown in FIG. 6, the pawl receiving grooves 23a are configured to guide the pawls 30A and 30B due to guide walls 21a to 21d formed as raised walls each of which is positioned in both of right and left sides in a circumferential direction of each groove, so as to be capable of moving the same only radially inwards and outwards (in a vertical direction in the drawing:

which corresponds to a specific linear direction of the present invention) with respect to the guide 20 therealong.

Next, with reference to FIG. 1 again, constructions of the three pawls 30A and 30B will be described. One (i.e., the pawl 30B) of these pawls 30A and 30B is formed to have a shape different from the other two pawls (i.e., the pawls 30A). However, each of the pawls 30A and 30B has the same basic construction in that it is received in each of the pawl receiving grooves 23a formed in the above-described guide 20 and in that it is guided so as to be movable only radially inwards and outwards with respect to the guide 20. Formed in radially outer circumferential surfaces of the pawls 30A and 30B are the curved outer peripheral toothed surfaces 30Aa and 30Ba each of which has outer teeth that are capable of meshing with the inner circumferential toothed surface 12a of the above-described ratchet 10.

As shown in FIG. 6, the pawls 30A and 30B are configured to be pushed out radially outwards from an inner side by the rotary cam 40 which will be hereinafter described, so that the outer circumferential toothed surfaces 30Aa and 30Ba thereof can be pressed against and meshed with the inner circumferential toothed surface 12a of the ratchet 10. Upon meshing, the pawls 30A and 30B can be circumferentially integrated with the ratchet 10. As a result, the ratchet 10 and the guide 20 can be locked in a condition in which they are circumferentially integrated with via the pawls 30A and 30B.

That is, as previously described, because the pawls 30A and 30B are circumferentially supported so as to be movable only radially inwards and outwards with respect to the guide 20, when they are meshed with the ratchet 10 to be integral therewith in a rotating direction, a condition in which a relative rotation between the guide 20 and the ratchet 10 is locked can be obtained. The condition in which the relative rotation between the ratchet 10 and the guide 20 is locked can be released when the pawls 30A and 30B are moved radially inwards via a reverse rotation (a clockwise rotation in the drawings) of the rotary cam 40 so as to be released from a meshed condition with respect to the ratchet 10.

With reference to FIG. 1 again, among the three pawls 30A and 30B, the pawl 30B positioned in an upper side in the drawing is vertically split along an advancing/retreating moving direction (a radial direction) thereof, so as to be divided into two divisional pawls 30B1 and 30B2 positioned in right and left sides. In particular, as shown in FIG. 6, a division line dividing the pawl 30B into the two divisional pawls 30B1 and 30B2 is set to have inclined surfaces 30B1a and 30B2a, holding surfaces 30B1c and 30B2c and vertical surfaces 30B1b and 30B2b. The inclined surfaces 30B1a and 30B2a are configured to bring the two divisional pawls 30B1 and 30B2 into face-contact with each other obliquely in rotating directions (lateral directions) with respect to an advancing moving direction of the pawl 30B. The holding surfaces 30B1c and 30B2c are configured to form a V-shaped inclined surfaces with respect to the inclined surfaces 30B1a and 30B2a so as to form a condition in which the divisional pawl 30B1 is vertically (radially) held by the divisional pawl 30B2. Further, the vertical surfaces 30B1b and 30B2b are configured to bring the two divisional pawls 30B1 and 30B2 into face-contact with each other in a direction perpendicular to the advancing moving direction of the pawl 30B.

Among the divisional pawls 30B1 and 30B2, the divisional pawl 30B2 positioned in a left side in FIG. 1 has a circumferential width that is greater than the other divisional pawl 30B1. Formed in an outer circumferential surface of the divisional pawl 30B2 is the outer circumferential toothed surface 30Ba (which correspond to an engagement tooth of the present invention). Further, the divisional pawl 30B1 that is positioned in a right side in FIG. 1 and has a smaller circumferential width has no outer circumferential toothed surface. The divisional pawls 30B1 and 30B2 respectively have leg portions 32B that are configured to be pushed out radially outwards from the inner side by the rotary cam 40. In addition, the divisional pawl 30B2 has a hook-shaped engagement portion 31B that is configured to be drawn radially inwards by the rotary cam 40.

The pawls 30A and 30B are moved as follows by rotational movement of the rotary cam 40. That is, as shown in FIG. 6, when the rotary cam 40 is rotated counterclockwise in the drawing from a condition shown in FIG. 7 by the biasing force of the spiral spring 60 (FIG. 1), the pawls 30A and 30B are pushed out radially while the leg portions 32A and 32B of the pawls 30A and 30B ride on shoulder portions 42 of the rotary cam 40. As a result, the outer circumferential toothed surfaces 30Aa and 30Ba of the pawls 30A and 30B are pressed against the inner circumferential toothed surface 12a of the ratchet 10 so as to be meshed therewith. In this condition, the pawls 30A and 30B can be supported radially from the inner side by the rotary cam 40, so as to maintain a condition in which the ratchet 10 is rotationally locked with respect to the guide 20.

Among these pawls, in the pawl 30B that is positioned in the upper side and divided into two portions, when the above-described rotary cam 40 rotates, the left side divisional pawl 30B1 rides on the shoulder portion 42 of the rotary cam 40 and is pushed out radially. When the divisional pawl 30B1 is pushed out, the right side divisional pawl 30B2 is pushed out radially. In particular, when the left side divisional pawl 30B1 is radially pushed out, the inclined surface 30B2a of the right side divisional pawl 30B2 facing the inclined surface 30B1a of the divisional pawl 30B1 is pressed by the inclined surface 30B1a of the divisional pawl 30B1, so that the divisional pawl 30B2 is pushed out radially while being obliquely pushed out to the right side. As a result, the divisional pawl 30B2 on the right side is pushed out to a position in which the outer circumferential toothed surface 30Ba of the pawl 30B is pressed against the inner circumferential toothed surface 12a of the ratchet 10 and meshed therewith while it is pressed against the guide wall 21a positioned in the same side.

Further, when the left side divisional pawl 30B1 is pushed out radially by the rotary cam 40, it can be pushed out obliquely to the left side by a reaction force due to the face contact between the inclined surfaces 30B1a and 30B2a. As a result, the divisional pawl 30B1 can be pushed out radially obliquely while it is pressed against the guide wall 21b on the same side. Further, when the right side divisional pawl 30B2 is pushed out to the position in which it can mesh with the ratchet 10, the left side divisional pawl 30B1 can be maintained in a condition in which it is held between the inclined surface 30B2a of the divisional pawl 30B2 and the guide wall 21b. As a result, the two divisional pawls 30B1 and 30B2 are pressed in the rotating directions opposite to each other, so as to be pressed against the guide walls 21a and 21b positioned in both sides thereof. Thus, the two divisional pawls 30B1 and 30B2 can be retained, so as to not produce looseness within a space between the two guide walls 21a and 21b in the rotating directions (the lateral directions). As a result, the two divisional pawls 30B1 and 30B2 can be locked while the relative rotation between the ratchet 10 and the guide 20 can perform without backlash. That is, the pawl 30B can be meshed with the inner circumferential toothed surface 12a of the ratchet 10 while a clearance between the guide wall 21a and the guide wall 21b that are formed to smoothly slide the pawl 30B in the advancing/retreating directions is cleared.

Further, the right side divisional pawl 30B2 is configured to be pushed out radially while always leaving a slight clearance between the leg portion 32B thereof and the shoulder portion 42 of the rotary cam 40 when the left side divisional pawl 30B1 is pushed out radially in order to obtain the above-described locked condition. As a result, the right side divisional pawl 30B2 can be prevented from being radially pushed out to be meshed with the inner circumferential toothed surface 12a of the ratchet 10 before it is pushed out in the rotating direction by the left side divisional pawl 30B1. Therefore, the right side divisional pawl 30B2 can be meshed with the inner circumferential toothed surface 12a of the ratchet 10 while it is reliably pressed against the guide wall 21a.

In the locked condition in which the pawls 30A and 30B are meshed with the inner circumferential toothed surface 12a of the ratchet 10 by the rotation of the rotary cam 40, the shoulder portions 42 of the rotary cam 40 are positioned in inner peripheral sides of the leg portions 32A and 32B thereof, so that the leg portions 32A and 32B are supported by the rotary cam 40 from radially inner sides. As a result, in the above-described locked condition, even if a large load involving a forcible relative rotation between the ratchet 10 and the guide 20 is applied due to a vehicle collision or the like such that pressurizing forces directed to the radially inner sides can be applied to the pawls 30A and 30B to disengage the same from the inner circumferential toothed surface 12a of the ratchet 10, the pawls 30A and 30B can be supported from the inner sides by the rotary cam 40. As a result, the pawls 30A and 30B can be retained so as to not be released from the meshed condition with respect to the ratchet 10.

Further, in the pawl 30B divided into two, as previously described, the division line dividing the pawl 30B into the two divisional pawls 30B1 and 30B2 has the inclined surfaces 30B1a and 30B2a that are configured to bring the two divisional pawls 30B1 and 30B2 into face-contact with each other obliquely in the rotating directions, the holding surfaces 30B1c and 30B2c that are configured to form the V-shaped inclined surfaces with respect to the inclined surfaces 30B1a and 30B2a, and the vertical surfaces 30B1b and 30B2b that are configured to bring the two divisional pawls 30B1 and 30B2 into straight face-contact with each other in the direction perpendicular to the advancing/retreating direction (the radial direction) of the divisional pawls 30B1 and 30B2. Therefore, the reclining device 4 may have a high lock strength when the above-described large load is applied thereto.

That is, when the large load involving the forcible relative rotation between the ratchet 10 and the guide 20 is applied, the pawls 30A and 30B meshed with the ratchet 10 can be applied with forces that rotate the same integrally with the ratchet 10 with respect to the guide 20. As shown in FIG. 6, among them, in the pawl 30B held between the two guide walls 21a and 21b without clearances works, when, for example, the ratchet 10 applied with a force that forcibly rotates the same counterclockwise with respect to the guide 20, the right side divisional pawl 30B2 meshed with the ratchet 10 pressurizes the left side divisional pawl 30B1. As a result, the left side divisional pawl 30B1 can be pressed against the left side guide wall 21b to be supported by the guide wall 21b. Thus, the rotational movement of the ratchet 10 with respect to the guide 20 can be prevented.

In this process, the force applied from the right side divisional pawl 30B2 to the left side divisional pawl 30B1 in the rotating direction can be applied substantially straight such that the force cannot be lost in the rotating direction due to a holding structure in which the left side divisional pawl 30B1 can be held so as to not be moved radially by the contact between the inclined surfaces 30B1a and 30B2a and the contact between the holding surfaces 30B1c and 30B2c that form the face-contact in the rotating direction in a V-shaped holding fashion and a linear contact surface structure in which the force input in the rotating direction can be transmitted straight in the rotating direction by the contact between the two vertical surfaces 30B1b and 30B2b. As a result, the force applied to the pawl 30B from the ratchet 10 is not concentrated to operational components such as the rotary cam 40. That is, such a force can be also received by the guide 20 that is formed to have a high structural strength for supporting the operational components. Thus, the pawl 30B cannot be easily released from the meshed condition with respect to the ratchet 10, so that the reclining device 4 can have the high lock strength.

Further, in the pawl 30B, when the ratchet 10 receives a force that forcibly rotates the same clockwise with respect to the guide 20, the right side divisional pawl 30B2 meshed with the ratchet 10 is pressed against the right side guide wall 21a and supported by the guide wall 21a, so that the ratchet 10 can be prevented from being rotationally displaced with respect to the guide 20. In the pawl 30B described above, the two divisional pawls 30B1 and 30B2 have a contact structure that is capable of linearly transmitting the force in the rotating direction. Therefore, in order to attach the two divisional pawls 30B1 and 30B2 to the guide 20, it is possible to grasp the divisional pawls 30B1 and 30B2 by pinching the same between fingers and to easily lift the same collectively. Therefore, it is possible to easily attach the divisional pawls 30B1 and 30B2 to the guide 20 collectively.

Figure 7:
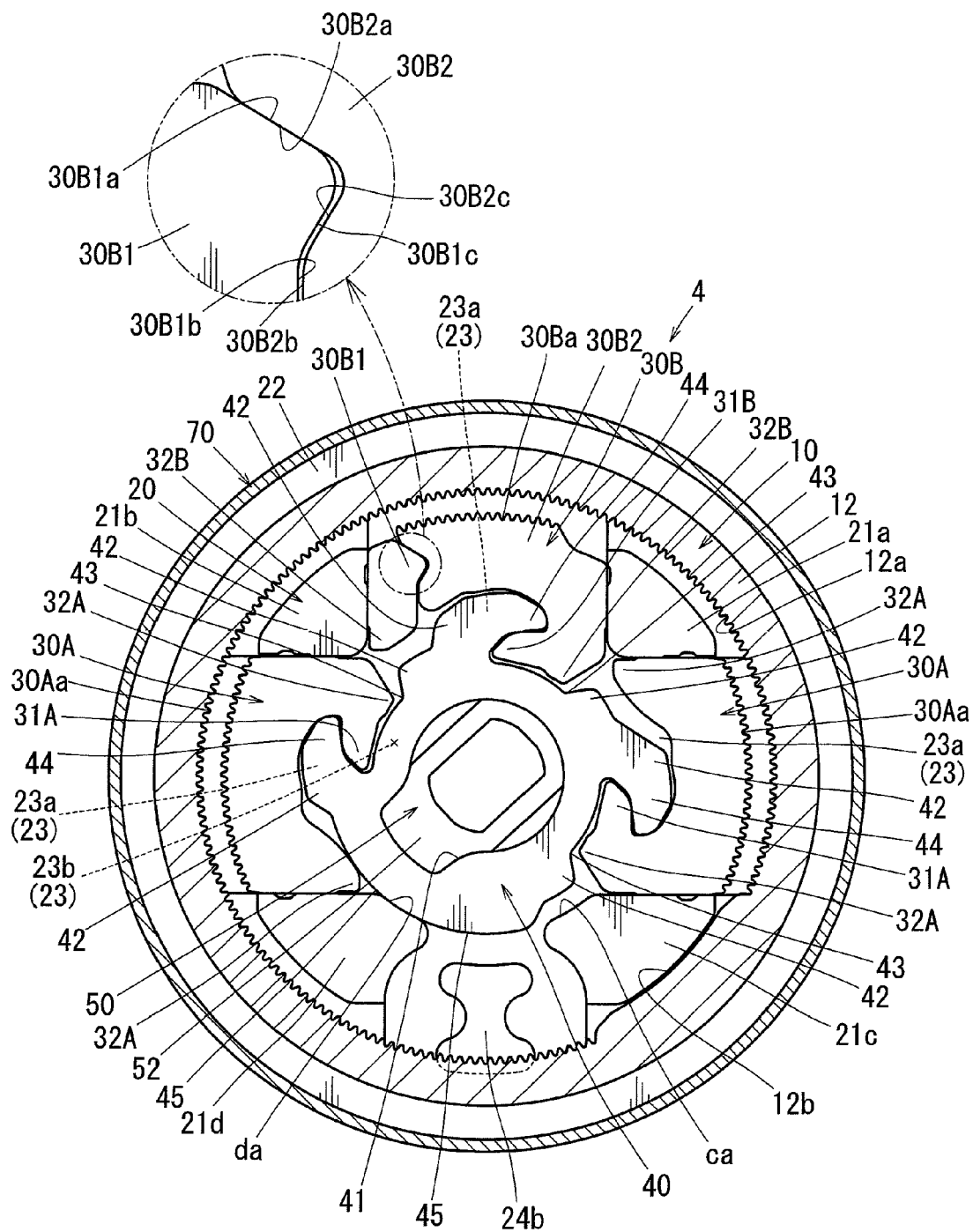
FIG. 7 is a sectional view of the reclining device, which view illustrates an unlocked condition thereof.

Further, as shown in FIG. 7, as the rotary cam 40 is rotated clockwise from a condition shown in FIG. 6, hook-shaped engagement portions 31A and 31B formed in inner peripheral side portions of the pawls 30A and 30B are engaged with hooks 44 formed in outer peripheral portion of the rotary cam 40, so as to be drawn radially inwards. Thus, the meshed condition in which the pawls 30A and 30B are meshed with the inner circumferential toothed surface 12a of the ratchet 10 can be released. As a result, a condition in which relative rotation of the ratchet 10 with respect to the guide 20 is locked can be released.

Among these pawls, in the pawl 30B that is positioned in the upper side and divided into two portions, when the above-described rotary cam 40 rotates, the right side divisional pawl 30B2 is drawn in by the hook 44 of the rotary cam 40. As a result, the left side divisional pawl 30B1 is drawn radially inwards by the right side divisional pawl 30B2, so as to be drawn radially inwards together with the right side divisional pawl 30B2. In particular, when the right side divisional pawl 30B2 is drawn radially inwards, the inclined surface 30B1a facing the inclined surface 30B2a of the divisional pawl 30B2 is pressurized radially inwards by the inclined surface 30B2a of the divisional pawl 30B2. Thus, the divisional pawl 30B1 can be drawn inwards together with the divisional pawl 30B2.

Next, with reference to FIG. 1 again, a construction of the rotary cam 40 will be described. The rotary cam 40 has the shoulder portions 42 and the hooks 44 that are fomed in an outer peripheral portion of a disk-shaped main body portion thereof. The shoulder portions 42 are configured to pressurize the pawls 30A and 30B radially outwards when the rotary cam 40 is rotated in one direction. Conversely, the hooks 44 are configured to draw the pawls 30A and 30B radially inwards when the rotary cam 40 is rotated in the other direction. As shown in FIG. 6, as the rotary cam 40 is rotated counterclockwise by the biasing force of the spiral spring 60 (FIG. 1), the shoulder portions 42 allow the leg portions 32A and 32B of the pawls 30A and 30B to ride on projected portions formed in therein, so as to push out the pawls 30A and 30B radially outwards. As a result, the pawls 30A and 30B are pressed against the inner circumferential toothed surface 12a of the ratchet 10. Further, as shown in FIG. 7, when the rotary cam 40 is rotated clockwise from the condition shown in FIG. 6 against the spring biasing force, the hooks 44 are respectively hooked on the engagement portions 31A and 31B formed in the inner peripheral portions of the pawls 30A and 30B, so as to draw the pawls 30A and 30B radially inwards. Thus, the pawls 30A and 30B can be released from the meshed condition with respect to the ratchet 10. Further, formed in one side of each of the shoulder portions 42 of the rotary cam 40 is a groove portion 43 that is capable of receiving each of the movement of the leg portions 32A and 32B of the pawls 30A and 30B when they are drawn radially inwards.

As shown in FIG. 6, the above-described three pawls 30A and 30B are attached to the guide 20 while being circumferentially positioned at 90 degrees intervals with respect to the guide 20. As a result, among circumferentially intervening areas formed between the pawls 30A and 30B, the circumferentially intervening area formed between the left side pawl 30A and the right side pawl 30A and positioned in a lower side thereof may be significantly larger than the other circumferentially intervening areas. Further, the ratchet 10 is coupled to the guide 20 such that the bulged surface 12b thereof can move within the above-described large circumferentially intervening area. Therefore, a rotational area corresponding to the above-described locking zone in which the bulged surface 12b and the pawls 30A and 30B do not circumferentially overlap each other can be increased.

However, as the pawls 30A and 30B are positioned described above, in the condition in which the pawls 30A and 30B are pressed against and meshed with the inner circumferential toothed surface 12a of the ratchet 10 by rotation of the rotary cam 40, a reaction force generated by pressing the pawls 30A and 30B radially outwards can be unequally acted on the rotary cam 40. Due to the reaction force, the rotary cam 40 can be applied with a pressurization force that is directed downwardly, i.e., toward a lower area in which the circumferentially intervening area formed between the pawls 30A and 30B is widely opened. However, in the condition in which the pawls 30A and 30B are pressed against the inner circumferential toothed surface 12a of the ratchet 10, an outer peripheral surface (a supported surface 45) of the rotary cam 40 can be supported from an outer peripheral side by arcuately depressed support surfaces ca and da formed in two guide walls 21c and 21d that are positioned in the lower side area in which the above-described circumferentially intervening area is widely opened. As a result, even if the unequal reaction force from the pawls 30A and 30B is applied to the rotary cam 40, the rotary cam 40 can be supported by the support surfaces ca and da in a balanced condition, so that the pawls 30A and 30B can be strongly pressed against the inner circumferential toothed surface 12a of the ratchet 10. Thus, each of the pawls 30A and 30B may have a high lock strength.

With reference to FIG. 1 again, an operation to rotate the rotary cam 40 clockwise or counterclockwise can be performed by rotating the hinge cam 50 that is received in a cam hole 41 formed through a central portion of the rotary cam 40. The hinge cam 50 has a cylindrical main body portion inserted into the axial hole 25 formed in the guide 20, so as to be rotatably supported on the guide 20. The operation shaft 4c (FIG. 2) is inserted into and connected to the cylindrical main body portion, so that the hinge cam 50 can be integrally rotated with the operation shaft 4c about an axis.

Further, formed in one axially end portion of the hinge cam 50 is a rectangular tubular spring engagement portion 51 to which an inner end 61 of the spiral spring 60 is connected. Conversely, formed in the other axially end portion of the hinge cam 50 is an operational protrusion 52 that is configured to be fitted to the cam hole 41 of the rotary cam 40 and to push and move the rotary cam 40 in a rotational movement direction thereof. As shown in FIG. 4, an outer end 62 of the above-described spiral spring 60 is engaged with the spring engagement portion 24b that is projected form an outer disk surface of the guide 20, so that the hinge cam 50 can be normally rotationally biased counterclockwise in FIG. 6 by the biasing force of the spiral spring 60.

Thus, the hinge cam 50 can normally be biased by the biasing force of the spiral spring 60 such that the rotary cam 40 can be maintained in a condition in which it is rotated counterclockwise. As a result, the locked condition in which the pawls 30A and 30B are pressed against and meshed with the ratchet 10 can be maintained. As shown in FIG. 7, the above-described hinge cam 50 is rotated clockwise against the above-described biasing force by the pulling up operation of the operation lever 5 (FIG. 2), so as to rotate the rotary cam 40 in the same direction. As a result, the pawls 30A and 30B are operated by the rotary cam 40, so as to be released from the meshed condition with the ratchet 10. Thus, a rotationally locked condition of the reclining device 4 can be released.

Next, with reference to FIG. 1 again, a construction of an outer circumferential ring 70 will be described. The outer circumferential ring 70 is formed by stamping a thin steel plate into a ring-shaped member and then by half blanking a disk portion of the ring-shaped member in a thickness direction (an axial direction). The outer circumferential ring 70 thus formed has a stepped cylindrical shape and includes axially faced ring-shaped first and second seat surface portions 71 and 72 that are continuously formed successively radially outwards from an inner peripheral side surface portion thereof in a stepped form.

Further, an outer peripheral side surface portion of the outer circumferential ring 70 is formed to have a cylindrical shape that axially extends straight, and is formed as a bent surface portion 73 that is bent radially inwards and crimped in a condition in which the ratchet 10 and the guide 20 are disposed in an cylindrical interior of the outer circumferential ring 70. As shown in FIG. 5, the first seat surface portion 71 of the outer circumferential ring 70 is axially applied to an outer disk surface of the cylinder portion 12 of the ratchet 10 when the ratchet 10 is disposed in the cylindrical interior of the outer circumferential ring 70.

Further, the second seat surface portion 72 of the outer circumferential ring 70 is axially applied to an inner disk surface of the cylinder portion 22 of the guide 20 when the guide 20 is disposed in the cylindrical interior of the outer circumferential ring 70. When the ratchet 10 and the guide 20 are disposed in the cylindrical interior of the outer circumferential ring 70, the bent surface portion 73 protrudes beyond an outer disk surface of the guide 20 while surrounding the cylinder portion 22 of the guide 20 from an outer peripheral side thereof.

Further, when the bent surface portion 73 is bent radially inwards and crimped in this condition, the bent surface portion 73 can axially hold the cylinder portion 22 of the guide 20 between the bent surface portion 73 and the above-described second seat surface portion 72, so as to be integrally connected to the guide 20. Upon this connection, the ratchet 10 and the guide 20 can be maintained in a condition in which they are prevented from being axially separated from each other by the first seat surface portion 71, the second seat surface portion 72 and the bent surface portion 73 of the outer circumferential ring 70.

In particular, upon crimping of the bent surface portion 73, the outer circumferential ring 70 is integrally connected to the cylinder portion 22 of the guide 20 while the cylinder portion 22 of the guide 20 is clamped between the second seat surface portion 72 and the bent surface portion 73. Thus, a substantial clearance can be formed between the first seat surface portion 71 and the outer disk surface of the cylinder portion 12 of the ratchet 10 axially applied to the first seat surface portion 71, so as to allow the ratchet 10 to rotate relative to the guide 20 without substantial sliding resistance.

Further, as shown in FIG. 1, the first seat surface portion 71 has axially protruding small dot-like protrusions 71a that are formed in a plurality of circumferential portions thereon. As shown in FIG. 5, these protrusions 71a may form functional portions that allow the first surface portion 71 and the outer disk surface of the cylinder portion 12 of the ratchet 10 to contact each other via point contact such that rotational movement of the ratchet 10 with respect to the guide 20 can be smoothened.

Thus, according to the reclining device 4 (the locking device) of the present embodiment, when the pawl 30B divided into the two divisional pawls 30B1 and 30B2 is pushed and moved in the advancing direction by the rotary cam 40, the divisional pawls 30B1 and 30B2 are moved in the lateral directions opposite to each other due to the oblique contact structure in which the inclined surfaces 30B1a and 30B2a thereof can contact each other. As a result, the outer circumferential toothed surface 30Ba of the divisional pawl 30B1 is pressed against and meshed with the inner circumferential toothed surface 12a of the ratchet 10 while the divisional pawls 30B1 and 30B2 are respectively pressed against the guide walls 21a and 21b. Thus, both side portions of the pawl 30B are respectively pressed against both of the guide walls 21a and 21b, so that the pawl 30B can be meshed with the inner circumferential toothed surface 12a without producing looseness between the pawl 30B and the guide 20 in the rotating directions (the lateral directions).

In this meshed condition, even if the pawl 30B is applied with a load that rotates the ratchet 10 with respect to the guide 20 in the rotating direction, this load can be received relatively straight by the guide wall 21b corresponding to a direction of the load due to the contact structure in which the vertical surfaces 30B1b and 30B2b facing in the rotating direction (the lateral direction) of the pawl 30B contact each other and the holding structure in which the divisional pawl 30B2 contacts the divisional pawl 30B1 in the V-shaped holding fashion. As a result, the load applied to the rotary cam 40 pressing the pawl 30B in the advancing direction can be reduced. Therefore, even though the oblique contact structure for reducing the looseness is provided, the lock strength of the pawl 30B can be secured.

Further, the division line of the pawl 30B is set as a vertical division line that divides the outer circumferential surface of the pawl 30B in the lateral direction (the rotating direction). Therefore, as compared with a case in which the division line is set as an oblique division line that does not divide the outer peripheral surface, an inclination angle (a pressure angle) of each of the inclined surfaces 30B1a and 30B2a can be relatively increased and at the same time, a length of each of the vertical surfaces 30B1b and 30B2b can be lengthened. Further, the outer circumferential toothed surface 30Ba is formed in one divisional pawl 30B2, and no outer circumferential toothed surface is formed in the other divisional pawl 30B1. Therefore, the divisional pawl 30B1 having no outer circumferential toothed surface can be easily formed. Further, because the divisional pawl 30B1 does not mesh with the inner circumferential toothed surface 12a of the ratchet 10, a circumferential width of the divisional pawl 30B1 can be narrowed, and a circumferential width of the other divisional pawl 30B2 having the outer circumferential toothed surface 30Ba can be widened. As a result, the wide outer circumferential toothed surface 30Ba can be formed in the widened divisional pawl 30B2, so that the lock strength can be increased. In addition, the divisional pawl 30B2 can be increased in size by increasing the width thereof, so that the divisional pawl 30B2 can be prevented from being easily inclined during radial movement thereof.

Embodiment 2

Figure 8:
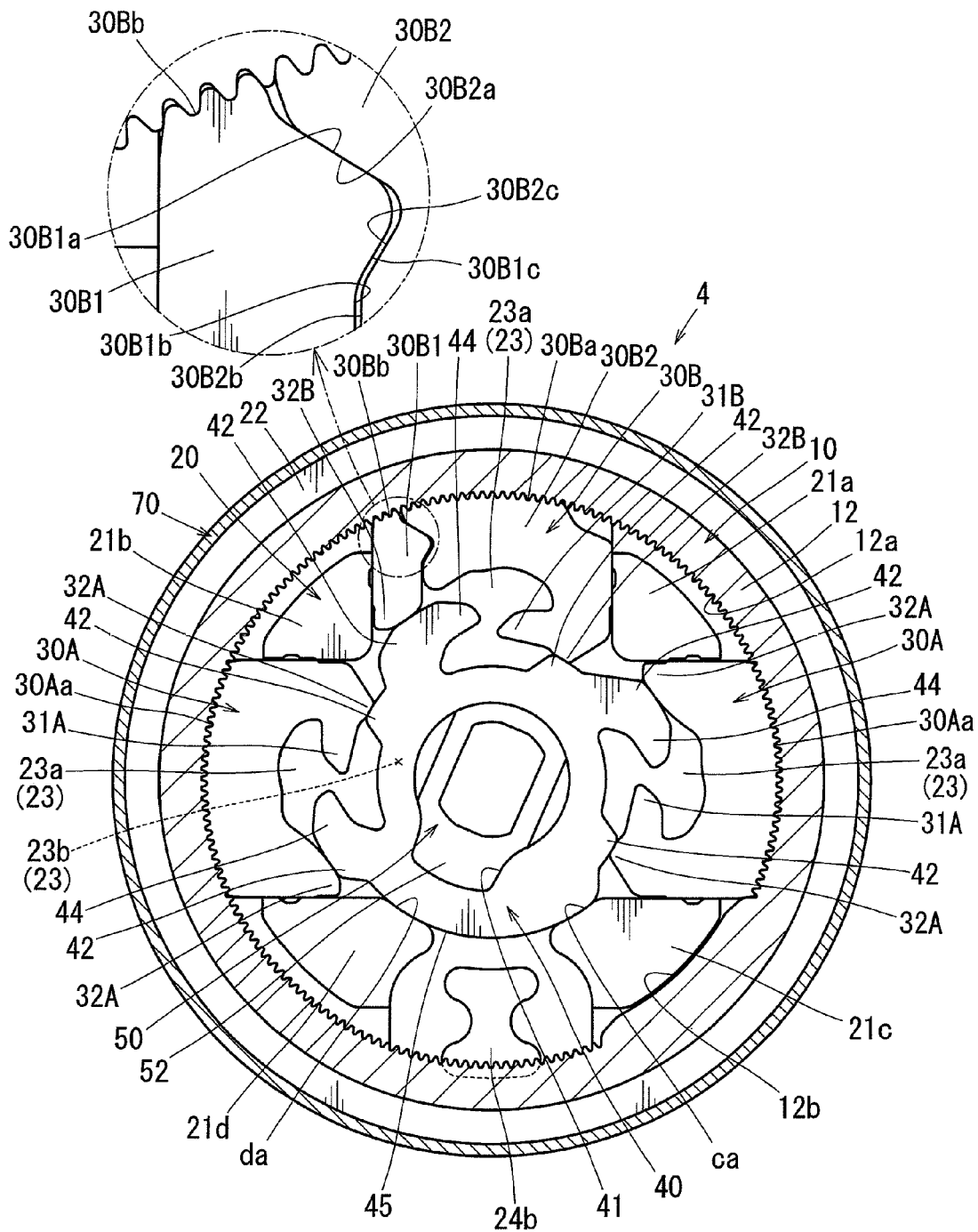
FIG. 8 is a sectional view of a reclining device according to Embodiment 2, which view illustrates a locked condition thereof.

Next, the reclining device 4 (the locking device) according to Embodiment 2 will be described with reference to FIG. 8. In the present embodiment, portions that are the same in the reclining device 4 (the locking device) of Embodiment 1 in construction and effect will be identified by the same reference numerals and a description thereof may be omitted. That is, portions that are different from the reclining device 4 (the locking device) of Embodiment 1 in construction and effect will be identified by different reference numerals and such portions will be described in detail. As shown in FIG. 8, in the reclining device 4 of the present embodiment, the divisional pawl 30B1 also has an outer circumferential toothed surface 30Bb. When the outer circumferential toothed surface 30Ba of the right side divisional pawl 30B2 is pressed against and meshed with the inner circumferential toothed surface 12a of the ratchet 10, the outer circumferential toothed surface 30Bb of the divisional pawl 30B1 can be loosely engaged with the inner circumferential toothed surface 12a of the ratchet 10, so that the divisional pawl 30B1 can engage the ratchet 10 while a slight clearance is formed between the outer circumferential toothed surface 30Bb thereof and the inner circumferential toothed surface 12a. Thus, when both of the divisional pawls 30B1 and 30B2 are pressed toward the guide walls 21b and 21a, one divisional pawl 30B2 can be prevented from being meshed with the inner circumferential toothed surface 12a earlier, so that the movement of the divisional pawls 30B1 and 30B2 cannot be restricted. As a result, the outer circumferential toothed surfaces 30Ba and 30Bb can be meshed with the inner circumferential toothed surface 12a of the ratchet 10 while both of the divisional pawls 30B1 and 30B2 can be reliably pressed against the guide walls 21a and 21b.

Embodiment 3

Figure 9:
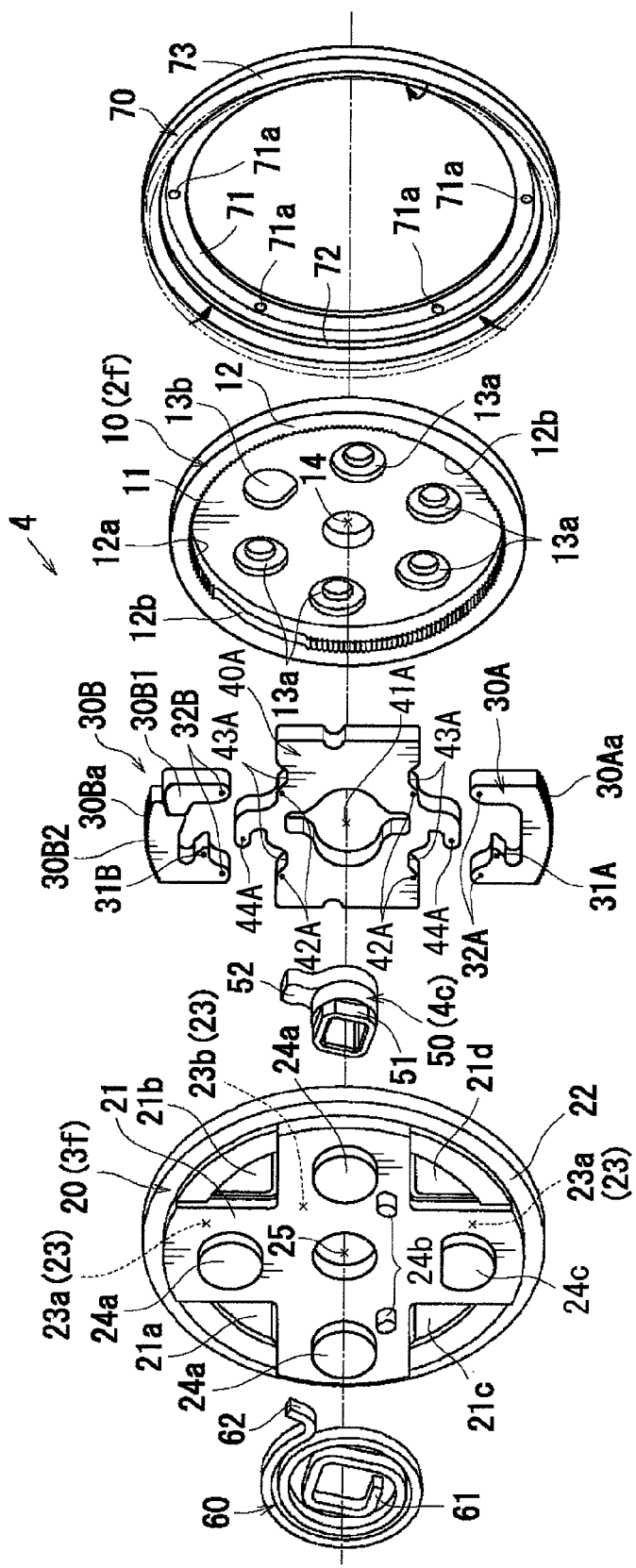
FIG. 9 is an exploded perspective view of a reclining device according to Embodiment 3, which view illustrates a construction thereof.
Figure 10:
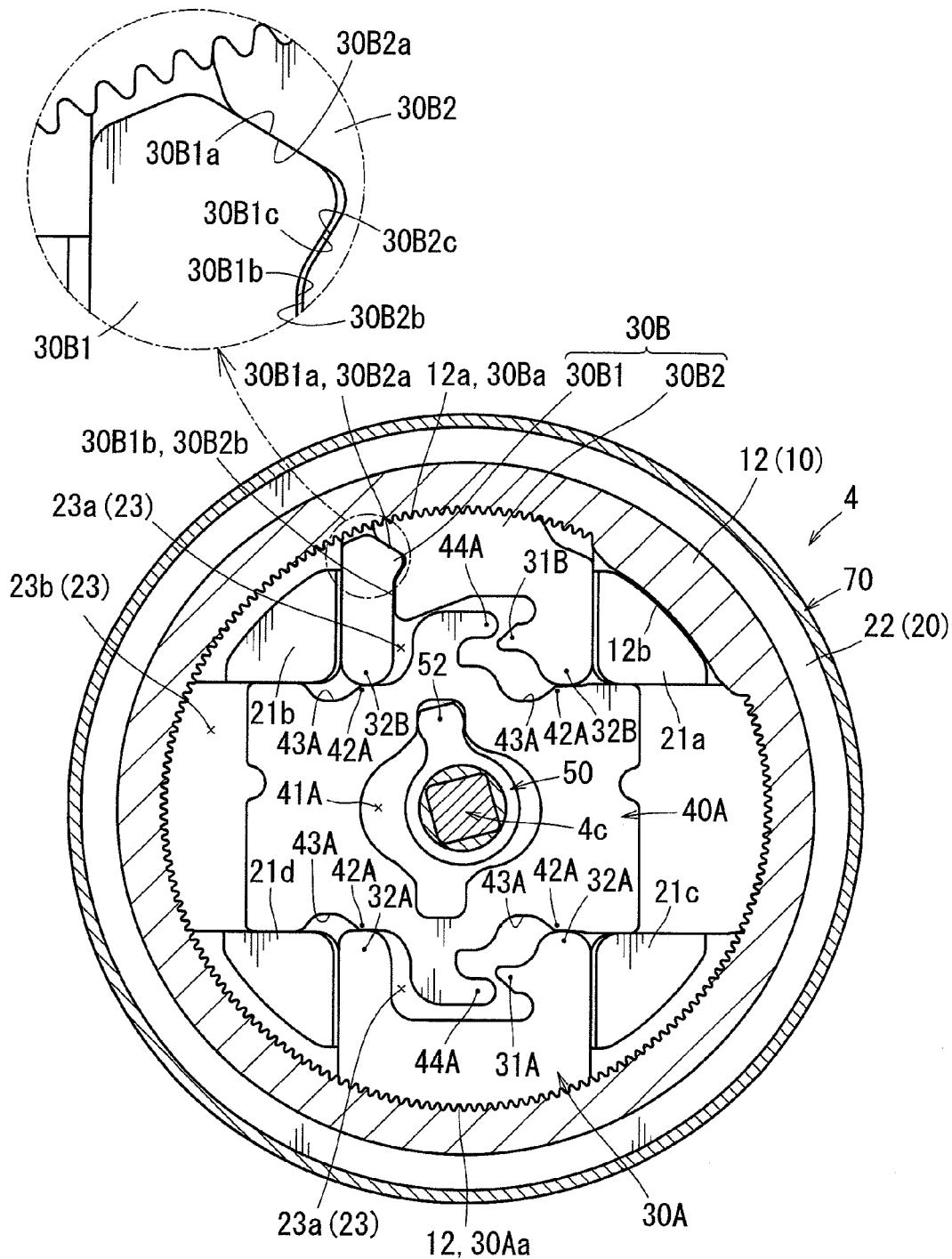
FIG. 10 is a sectional view of the reclining device, which view illustrates a locked condition thereof.

Next, the reclining device 4 (the locking device) of Embodiment 3 will be described with reference to FIGS. 9 and 10. In the present embodiment, portions that are the same in the reclining device 4 (the locking device) of Embodiment 1 in construction and effect will be identified by the same reference numerals and a description thereof may be omitted. That is, portions that are different from the reclining device 4 (the locking device) of Embodiment 1 in construction and effect will be identified by different reference numerals and such portions will be described in detail. As shown in FIGS. 9 and 10, in the reclining device 4 of the present embodiment, the pawls 30A and 30B that are meshed with the inner circumferential toothed surface 12a of the ratchet 10 are composed of two pawls, i.e., a non-divided pawl 30A and a divided pawl 30B.

Further, in the reclining device 4 of the present embodiment, instead of the rotary cam 40 of Embodiment 1, a slide cam 40A is used as a means to move the two pawls 30A and 30B radially inwards and outwards. Further, the slide cam 40A corresponds to the pressing cam of the present invention.

As shown in FIG. 10, the slide cam 40A is slidably guided by the guide walls 21a to 21d that are configured to slidably guide the pawls 30A and 30B. Further, the slide cam 40A is slidably guided in a direction perpendicular to sliding directions of the pawls 30A and 30B. The slide cam 40A is normally maintained in a condition in which it is slid leftward by the hinge cam 50 attached to a cam hole 41A formed in a the central position thereof and rotationally biased counterclockwise via the biasing force of the spiral spring 60.

Due to this sliding, the leg portions 32A and 32B of the pawls 30A and 30B can respectively ride on shoulder portions 42A formed in an upper surface portion and a lower surface portion of the slide cam 40A, so that the slide cam 40A can be maintained in a condition (a locked condition) in which the pawls 30A and 30B are pushed out radially outward to be pressed against the inner circumferential toothed surface 12a of the ratchet 10. Further, in the above-described locked condition, when the hinge cam 50 is rotated clockwise, hooks 44A formed in the upper surface portion and the lower surface portion of the slide cam 40A are respectively hooked on the engagement portions 31A and 31B of the pawls 30A and 30B, so that the pawls 30A and 30B are drawn radially inwards. Thus, each of the pawls 30A and 30B can be released from the meshed condition with the inner circumferential toothed surface 12a of the ratchet 10. As the slide cam 40A slides, the leg portions 32A and 32B of the pawls 30A and 30B can be received in groove portions 43A that are formed in portions adjacent to the shoulder portions 42A of the slide cam 40A. Further, as shown in FIG. 9, in the reclining device 4 of the present embodiment, the guide 20 has spring engagement portions 24c that are formed in the outer disk surface thereof as pin-shaped projections. Each of the spring engagement portions 24c is intended to be engaged with the outer end 62 of the spiral spring 60. The guide 20 has a D-shaped dowel 24c that is formed in the outer disk surface thereof, which disk surface is positioned opposite to the pawl receiving groove 23a in which the pawl 30A is received. The D-shaped dowel 24c is cylindrically protruded and partially cut away to have a D-shape (which can be fitted to the hole formed in the cushion frame 3f along with the dowels 24a). Thus, the construction of the present invention can be applied to the reclining device 4 in which the two pawls 30A and 30B are operated by the slide cam 40A.

In the description, the present invention is described with reference to the three embodiments. However, the present invention can be carried out in various forms other than the three embodiments described above. For example, in the above-described embodiments, the reclining device 4 is exemplified as the locking device. The reclining device 4 is constructed such that the relative rotation between the ratchet 10 and the guide 20 capable of rotating relative to each other can be regulated by meshing engagement of the teeth. However, the locking device is not limited to the use to prevent the relative rotation in the reclining device 4. The locking device can be applied to various structures in which relative movement between a first member and a second member capable of moving relative to each other can be regulated by meshing engagement of teeth and maintained in a regulated condition.

Further, in Embodiments 1 and 2, the three pawls 30A and 30B are positioned on the guide 20, and in Embodiment 3, the two pawls 30A and 30B are positioned on the guide 20. However, the number of the pawls are not limited to any special number. Further, in the above-described embodiments, the division line dividing the pawl 30B into two divisional pawls 30B1 and 30B2 is set such that the inclined surfaces 30B1a and 30B2a to contact the two divisional pawls 30B1 and 30B2 each other obliquely can be positioned radially outside than the vertical surfaces 30B1b and 30B2b (30B1c and 30B2c). However, the division line can be set such that the inclined surfaces can be positioned radially inside of the vertical surfaces.

The invention claimed is:

1. A locking device capable of forming a condition in which relative rotation of a first member and a second member configured to move relative to each other is locked by meshing engagement of teeth and capable of maintaining the condition, comprising:

a pawl provided and guided so as to be capable of advancing and retreating in a specific linear direction with respect to the first member;

a pressing cam configured to press the pawl in an advancing direction with respect to the first member; and an engaged tooth formed in the second member and configured to mesh with an engagement tooth of the pawl pressed that is moved in the advancing direction by the pressing cam, wherein the pawl is guided by raised wall-shaped guide walls formed in the first member while both side portions of the guide walls corresponding to an advancing/retreating moving direction are applied to the pawl, wherein the pawl is divided into two divisional pawls configured to obliquely contact with each other, so as to be pressed and moved away from each other in opposite lateral directions and to be pressed against the guide walls positioned in respective lateral directions when the pawl is pressed and moved in the advancing direction by the pressing cam, and wherein a division line dividing the pawl into the two divisional pawls is set to form inclined surfaces that are configured to bring the two divisional pawls into face contact with each other obliquely with respect to the advancing moving direction of the pawl, vertical surfaces parallel to surfaces of the guide walls that are configured to bring the two divisional pawls into face contact with each other in a direction perpendicular to the pawl advancing moving direction relative to the inclined surfaces, and holding surfaces that are configured to form V-shaped inclined surfaces with respect to the inclined surfaces so as to vertically hold the two divisional pawls in the pawl advancing moving direction, wherein the division line dividing the pawl into the two divisional pawls is set as a vertical division line parallel to the surfaces of the guide walls that is configured to laterally divide an outer circumferential surface of the pawl at a forward end side in the advancing direction of the pawl.

* * * * *